United States Patent
Moyer

(10) Patent No.: US 8,001,591 B2
(45) Date of Patent: Aug. 16, 2011

(54) DISTRIBUTED RESOURCE ACCESS PROTECTION

(75) Inventor: William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1385 days.

(21) Appl. No.: 11/343,454

(22) Filed: Jan. 31, 2006

(65) Prior Publication Data

US 2007/0180518 A1 Aug. 2, 2007

(51) Int. Cl.
*G06F 7/00* (2006.01)

(52) U.S. Cl. ............... 726/16; 726/17; 726/21; 173/190; 173/193; 173/194; 380/264

(58) Field of Classification Search ........... 713/190–194
See application file for complete search history.

(56) References Cited

U.S. PATENT DOCUMENTS

| | | | | |
|---|---|---|---|---|
| 4,434,464 A * | 2/1984 | Suzuki et al. | ................. | 711/164 |
| 4,888,802 A * | 12/1989 | Cooney | ..................... | 380/277 |
| 4,890,223 A * | 12/1989 | Cruess et al. | ................. | 711/207 |
| 6,061,753 A * | 5/2000 | Ericson | ........................ | 710/107 |
| 6,654,818 B1 * | 11/2003 | Thurber | ........................... | 710/3 |
| 6,851,056 B2 | 2/2005 | Evans | | |
| 7,185,205 B2 * | 2/2007 | Launchbury et al. | ......... | 713/189 |
| 7,441,116 B2 * | 10/2008 | Cheng | ........................... | 713/162 |
| 2003/0033537 A1 * | 2/2003 | Fujimoto et al. | ............... | 713/193 |
| 2003/0065933 A1 * | 4/2003 | Hashimoto et al. | ........... | 713/194 |
| 2003/0105967 A1 * | 6/2003 | Nam | ............................. | 713/189 |
| 2003/0172214 A1 | 9/2003 | Moyer | | |
| 2004/0177266 A1 | 9/2004 | Moyer | | |
| 2007/0140477 A1 * | 6/2007 | Wise | ................................ | 380/28 |

OTHER PUBLICATIONS

Yuminaka Y et al., An efficient data transmission technique for VLSI systems using multiple- valued code-division multiple access.,Aug. 2002,IEICE-INST Electronics Information Communications ENG , Kikai-Shinko-Kaikan Bldg Minato-Ku Shibakoen 3 Chome, Tokyo, 105,Japan.*

* cited by examiner

*Primary Examiner* — Taghi T Arani
*Assistant Examiner* — Amir Mehrmanesh

(57) ABSTRACT

A method includes determining, at a first requesting component of an integrated circuit device, a first key value based on a first set of one or more bits of a first address associated with a first access request of the first requesting component. The method further includes transmitting the first key value from the first requesting component to a resource component of the integrated circuit device. The method also includes determining, at the resource component, an authorization of the first access request based on the first key value and a second set of one or more bits of the first address.

16 Claims, 3 Drawing Sheets

DISTRIBUTED RESOURCE ACCESS PROTECTION

FIELD OF THE DISCLOSURE

The present disclosure is related generally to processing access requests in a processing device and more particularly to authorizing access requests for a device resource accessible by multiple device components.

BACKGROUND

Highly integrated devices, such as microcontrollers, can support multiple high-speed processing components, each of which are capable of requesting large quantities of information from multiple device resources. Due to the potential for conflict in resource utilization, these devices frequently utilize a memory management unit (MMU) or similar centralized device for controlling access to resources by multiple processing components. However, for certain implementations, the cost and complexity of the implementation of a MMU can be prohibitive. Accordingly, a technique for providing resource access management without a centralized MMU would be advantageous.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

Figure 1:
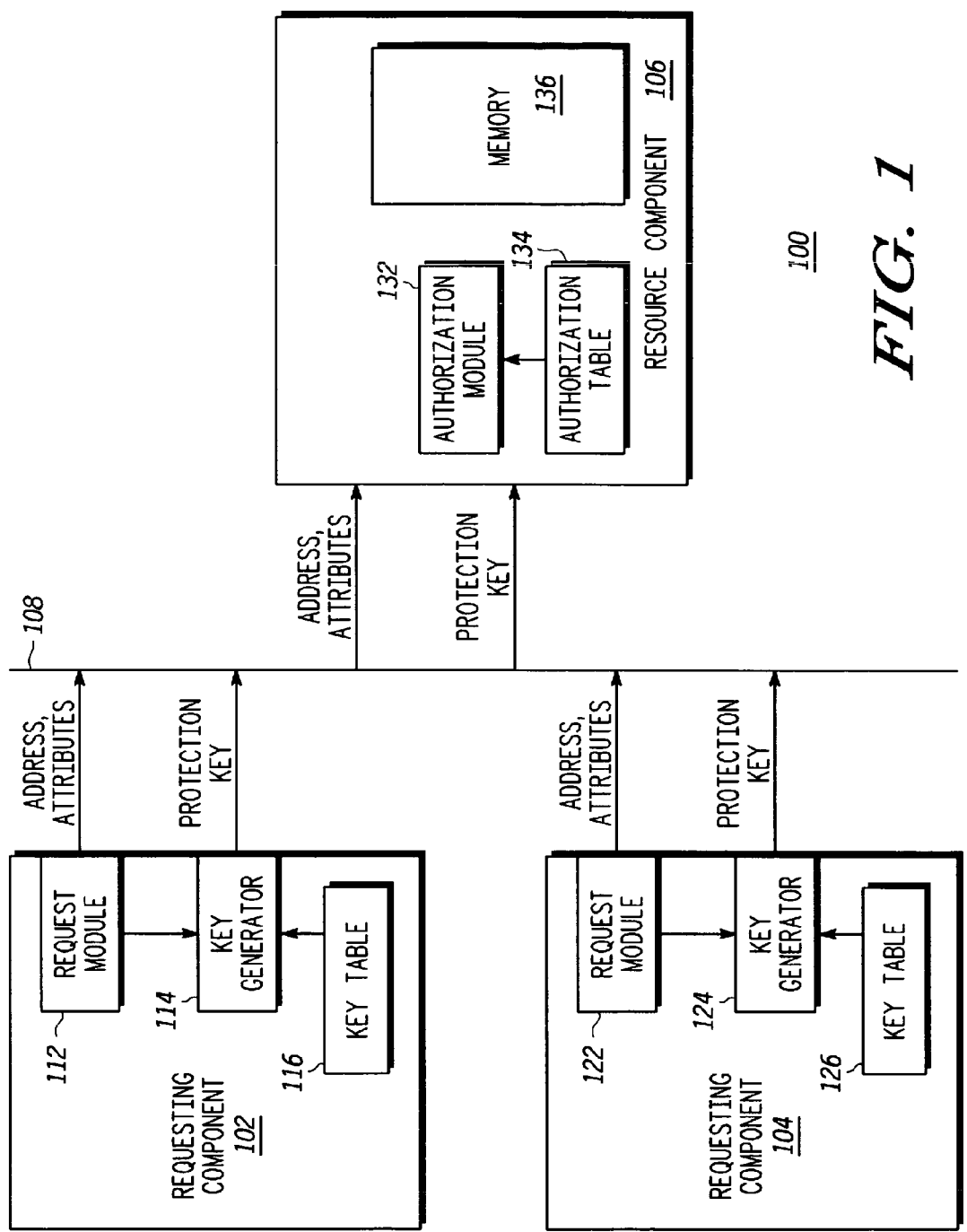
FIG. 1 is a partition diagram illustrating an integrated circuit device having distributed resource access protection in accordance with at least one embodiment of the present disclosure.

In accordance with one aspect of the present disclosure, a method includes determining, at a first requesting component of an integrated circuit device, a first key value based on a first set of one or more bits of a first address associated with a first access request of the first requesting component. The method further includes transmitting the first key value from the first requesting component to a resource component of the integrated circuit device. The method additionally includes determining, at the resource component, an authorization of the first access request based on the first key value and a second set of one or more bits of the first address.

In accordance with another aspect of the present disclosure, a method includes determining, at a requesting component of the integrated circuit device, an address associated with an access request of the requesting component during a first operational cycle of an integrated circuit device. The method further includes accessing an entry of a key table to determine a key value during the first operational cycle. The entry of the key table is indexed based on a first set of one or more bits of the address. The method additionally includes transmitting the address and the key value from the requesting component to a resource component during a second operational cycle of the integrated circuit device subsequent to the first operational cycle. The method further includes determining, at the resource component, an authorization of the access request based on the key value and a second set of one or more bits of the address during a second operational cycle of the integrated circuit device subsequent to the first operational cycle.

In accordance with yet another aspect of the present disclosure, an integrated circuit device includes a first requesting component including logic to determine a first key value based on a first set of one or more bits of a first address associated with a first access request of the first requesting component and logic to provide the first key value for transmission via a bus. The integrated circuit device further includes a resource component including logic to determine an authorization of the first access request based on the first key value and a second set of one or more bits of the first address.

FIGS. 1-4 illustrate exemplary techniques for distributed resource access protection for devices implementing multiple requesting components that can access the same device resource. In at least one embodiment, a requesting component generates a protection key for association with an access request to be provided to a device resource component, such as, for example, an embedded random access memory (RAM). The protection key and other information associated with the access request, such as address information, are provided from the requesting component to the device resource component. In response to receiving the protection key, the device resource component authorizes the access request based on the protection key. Authorization also can be based on other information, such as the address information. Further, in one embodiment, the requesting component determines the protection key and the address information in one operation cycle and during the next operation cycle, the requesting component provides the protection key and the address information to the device resource component, which also authorizes the access request based on the protection key in the same operation cycle. As a result, the effort in both generating a key and then authorizing an access request based on the generated key can be distributed between both the requesting component and the resource component and between operation cycles, thereby enabling the implementation of a protection scheme without requiring a MMU or other centralized authorization component and without requiring an extended operation cycle in which the key otherwise would be both generated and verified in a single component.

FIG. 1 illustrates an exemplary integrated circuit device 100 having distributed resource access authorization in accordance with at least one embodiment of the present disclosure. As illustrated, the device 100 includes a plurality of requesting components (requesting component 102 and requesting component 104) and one or more resource components (resource component 106) connected via one or more busses (bus 108). Examples of the requesting components 102 and 104 include central processing units (CPUs), digital signal processors (DSPs), direct memory access (DMA) engines, other types of bus masters, and the like. Examples of the resource component 106 include storage devices such as static random access memories (SRAMs) and dynamic random access memories (DRAMs), peripheral devices, and the like. It will be appreciated that in certain instances the requesting components can include resource components and vice versa.

The requesting component 102 includes a request module 112, a key generation module 114 and a key table 116. Similarly, the requesting component 104 includes a request module 122, a key generation module 124 and a key table 126. The resource component 106 includes an authorization module 132 and an authorization table 134. Further, in the illustrated example, the resource component 106 includes an internal memory component having embedded RAM 136. The modules 112, 114, 122, 124 and 132 may be implemented as hardware, such as state machines, static logic or dynamic logic, as software, such as microcode or firmware, or any combination thereof. The key table 126 and the authorization table 134 may be implemented as register files, caches, and the like.

In operation, the requesting components 102 and 104 generate access requests so as to access or otherwise utilize the resource component 106. In the illustrated example where the resource component 106 includes an embedded RAM, the access requests can include memory read requests, memory write requests, memory read-modify-write requests, and the like. During access request generation at, for example, the requesting component 102, the request module 112 determines access information associated with the access request, such as address information, attribute information (e.g., a request identifier), and the like. The request module 112 provides the access information to the resource component 106 via the bus 108. During or after the generation of the access information, the key generation module 114 determines a protection key to associate with the access request, whereby the protection key is utilized by the resource component 106 for authorization purposes. In at least one embodiment, the request module 112 provides a set of one or more address bits of the address associated with the access request (e.g., the address of a memory location of memory 136) to the key generation module 114. The key generation module 114 then utilizes the set of address bits to access an entry of the key table 116, where each entry of the key table 116 stores a predetermined protection key for use by the requesting component 102. In one embodiment, the number of entries of the key table 116 is related to the number of bits in the set of address bits. To illustrate, if the set of address bits includes two address bits, the key table 116 can include up to four entries (or $2^2$ entries).

After determining the protection key, the key generation module 114 can provide the protection key to the resource component 106 along with the transmission of the address and other access information. In response to receiving the protection key, the authorization module 132 determines an authorization of the associated access request based on the protection key. If authorized, the resource component 106 can initiate processing of the access request. Otherwise, the resource component 106 denies or delays processing of the access request.

In at least one embodiment, the resource component 106 utilizes a set of one or more bits of the received address to determine whether the protection key is authorized. As discussed in greater detail with reference to FIG. 2, the authorization table 134 can include a plurality of entries that indicate which protection keys are authorized and which protection keys are not authorized under certain circumstances. In this instance, the set of one or more address bits can be used as an index to the authorization table 134 to identify the corresponding table entry. The set of address bit(s) used by the authorization module 132 may or may not overlap with the set of address bits used by the key generation module 114.

In certain instances, some or all of the requesting components of the device 100 implement the protection key technique described herein. However, it will be appreciated that the access scheme applicable to one requesting component can be different from the access schemes applicable to other requesting components. Accordingly, in one embodiment, the key table 116 of the requesting component 102 may be configured separately from the key table 126 of the requesting component 104 so that some or all of the entries of the key table 116 store different protection keys than the corresponding entries of the key table 126. Accordingly, for the same set of address bits, the key table 116 may return a different protection key than the key table 126. Thus, the key tables 116 and 126 may be configured to tailor the authorization of the access requests of the requesting components 102 and 104 to be consistent with the intended access schemes.

Figure 2:
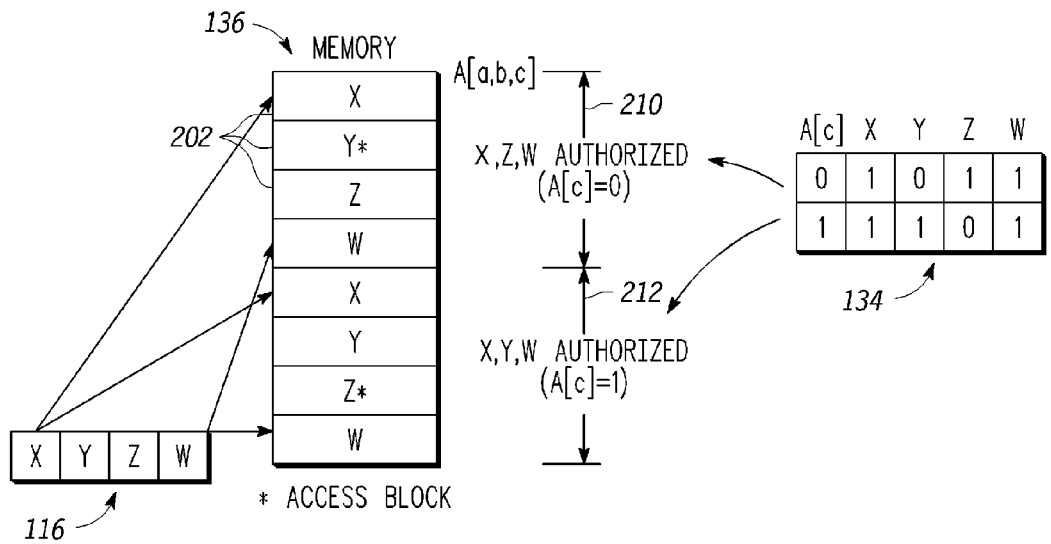
FIG. 2 is a diagram illustrating an exemplary implementation of a distributed resource access protection scheme in accordance with at least one embodiment of the present disclosure.

Referring to FIG. 2, a diagram depicting an exemplary implementation of the protection scheme in the device 100 of FIG. 1 is illustrated in accordance with at least one embodiment of the present disclosure. As shown, the key table 116 may be implemented as a table having a plurality of entries (four entries in this example), where each entry stores a predetermined protection key (values X, Y, Z and W). Each entry is indexed by a set of two address bits (bits A[a,b]) for address A associated with an access request.

In the illustrated example, the address A represents a memory address of the memory 136. As a set of the bits of address A (A[a,b]) are used to identify a particular table entry, and thus a particular protection key, the memory 136 is partitioned into a number of partitions (partitions 202), each partition 202 corresponding to a particular value of the set of address bits used to identify a table entry/protection key. The number of uniquely addressable partitions of memory depends on the number of address bits used, and typically is smaller than the total number of memory partitions. Thus, as illustrated by FIG. 2, the memory 136 is aliased so that the same protection key from the key table is associated with more than one memory partition. The associated protection key can be provided to any access within a given memory partition.

The authorization table 134, in this example, comprises a plurality of entries, each entry corresponding to a possible value for an address bit (bit A[c]) of the address A. Due to the aliasing of the memory partitions 202 of memory 136, the bits A[a, b] and bit A[c] in this example are mutually exclusive. Each entry further includes a field for each possible protection key, where a value of '1' in the field indicates that the corresponding protection key is authorized and a value of '0' indicates that the corresponding protection key is not authorized. As illustrated, the entry corresponding to address bit A[c]=0 indicates that the protection keys X, Z and W are authorized and that protection key Y is not authorized. Similarly, the entry corresponding to address bit A[c]=1 indicates that the protection keys X, Y and Z are authorized and that protection key Z is not authorized. Thus, when the requesting component 106 (FIG. 1) receives an address having a bit value of 0 at bit A[c] (corresponding to memory partition region 210), the corresponding access request is determined by the authorization module 132 (FIG. 1) as authorized if the associated protection key is one of protection keys X, Z or W based on the field values at the entry of authorization table 134 indexed when A[c] equals zero. Likewise, when the requesting component 106 receives an address having a bit value of 1 at bit A[c] (corresponding to memory partition region 212), the corresponding access request is determined to be authorized by the authorization module 132 if the associated protection key is one of protection keys X, Y or W based on the field values at the entry of authorization table 134 indexed when A[c] equals one.

To describe an exemplary operation by way of a particular example in the context of FIG. 2, assume that in an alternate embodiment the memory 136 is mapped to addresses 0x0000000 to 0x0001FFF (128 kilobytes total) and that the protection scheme is applied to the first half (64 kilobytes) of the memory 136. Further assume that the first half of the memory 136 is portioned into sixty-four partitions of 1 kilobyte each and that the set of bits used by the key generation module 114 to access the key table 116 includes four address bits, A[14:11], thereby resulting in sixteen different entries in the key table 116 indexed by the four address bits. As a result, the key generation module 114 can implement a 16:1 multiplexer coupled to the entries of the key table 116 and having an output selected based on the four address bits A[14:11]. Consequently, the authorization table 134 may include four entries indexed by two address bits A[16:15], where each of the four entries indicates which of the sixteen possible protection keys are authorized for the corresponding entry and which of the sixteen possible protection keys are not authorized.

Although FIG. 2 illustrates a particular implementation whereby the authorization table 134 is accessed based on one or more address bits, other criteria may be used to identify authorized protection keys without departing from the scope of the present disclosure. To illustrate, the authorization table 134 may identify certain protection keys as valid during certain time periods and unauthorized during other time periods. As another example, the device state (e.g., sleep mode, active mode, etc.) may be a parameter represented by the authorization table 134 for identifying authorized and unauthorized protection keys.

Figure 3:
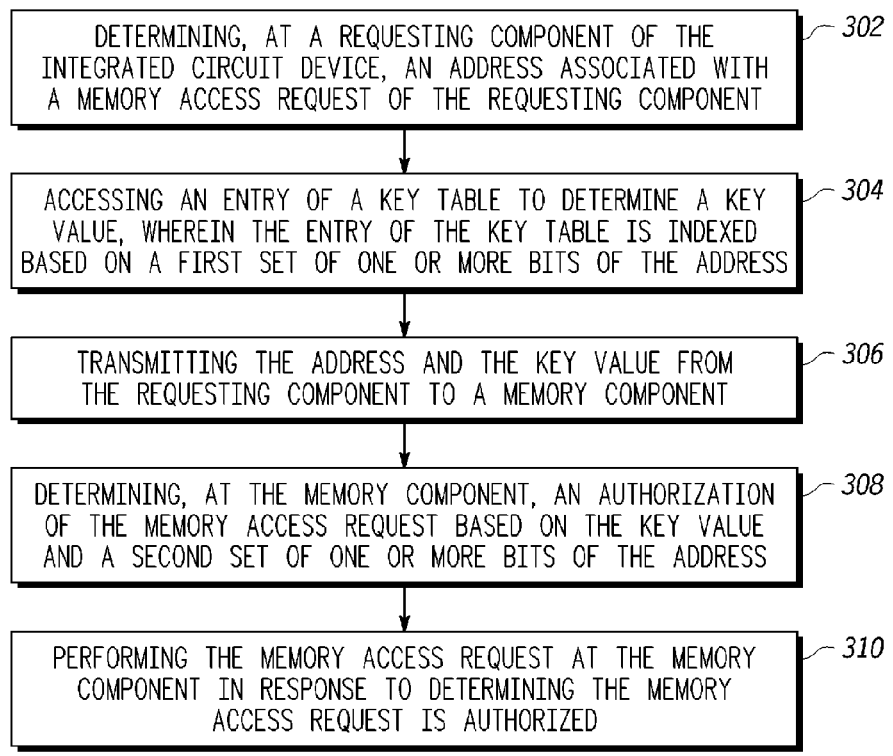
FIG. 3 is flow diagram illustrating a method for distributed resource access protection in accordance with at least one embodiment of the present disclosure.

Referring to FIG. 3, an exemplary distributed resource access protection method 300 is illustrated in accordance with at least one embodiment of the present disclosure. During a first operational cycle of an integrated circuit device, the method 300 includes determining, at a requesting component of the device, an address associated with an access request of the requesting component at block 302. Also during the first operational cycle, the method 300 includes accessing an entry of a key table to determine a key value at block 304. The key table is indexed based on a first set of one or more bits of the address to obtain a key value During a second operational cycle of the device subsequent to the first operational cycle, the method 300 includes transmitting the address and the key value from the requesting component to a resource component at block 306. Also during the second operational cycle, the method 300 includes determining, at the resource component, an authorization of the access request based on the key value and a second set of one or more bits of the address at block 308. The method 300 further includes performing the access request at the resource component in response to determining the access request is authorized at block 310.

Figure 4:
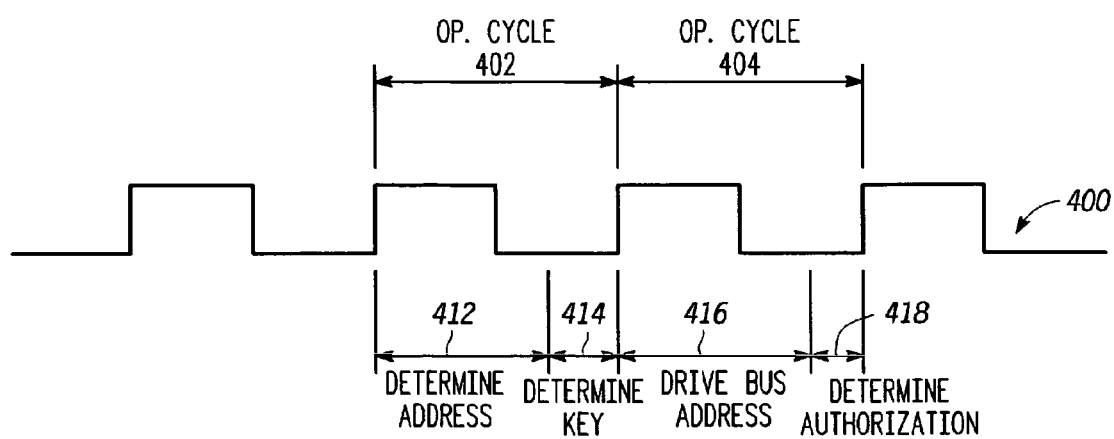
FIG. 4 is a diagram illustrating an exemplary timing of the method of FIG. 3 in accordance with at least one embodiment of the present disclosure.

Referring to FIG. 4, a timing diagram illustrating an exemplary timing of the device 100 of FIG. 1 and the method 300 of FIG. 3 is illustrated in accordance with at least one embodiment of the present disclosure. Clock 400 illustrates an exemplary clock signal utilized to control the operational cycles of the device 100. At duration 412 of a first operational cycle 402, a requesting component determines an address associated with an access request to be provided to a resource component. After determining the address, the requesting component determines the corresponding protection key based on a first set of address bits at duration 414 of the first operational cycle 414. As described above, the protection key can be determined from a key table indexed by the first set of address bits.

During the next operational cycle 404, the requesting component transmits the address and protection key to the resource component at duration 416. In response to receiving the protection key and address, the resource component determines an authorization of the access request using the protection key and a second set of one or more bits of the address at duration 418 of the operational cycle 404. As described above, authorization of an access request can be determined based on a table lookup of authorized protection keys using the second set of address bits.

As the timing diagram of FIG. 4 illustrates, the distribution of the resource protection scheme between the requesting component and the resource component can reduce or eliminate delays due to access authorization compared to conventional centralized protection schemes. That is, rather than requiring an extended operational cycle in which the requesting component determines an address, generates a key and then verifies the key, the requesting component instead can make use of the remaining duration between when the address is determined and the start of the next operational cycle to perform only part of the authorization process by way of determining the protection key using an efficient table lookup. Likewise, the resource component may utilize the remaining duration between when the address is received and the next operational cycle to finish the authorization process by authorizing the access request by way of the protection key using an efficient table lookup.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A method comprising:
   determining, at a first requesting component of an integrated circuit device, a first key value based on a first set of one or more bits of a first address associated with a first access request of the first requesting component, wherein determining the first key value comprises accessing a first key table associated with the first requesting component, the first key table comprising a plurality of key value entries indexed based on the first set of one or more bits;
   transmitting the first key value from the first requesting component to a resource component of the integrated circuit device;
   determining, at the resource component, an authorization of the first access request based on the first key value and a second set of one or more bits of the first address;
   determining, at a second requesting component of the integrated circuit device, a second key value based on a third set of one or more bits of a second address associated with a second access request of the second requesting component;
   transmitting the second key value from the second requesting component to the resource component of the integrated circuit device; and
   determining, at the resource component, an authorization of the second access request based on the second key value and a fourth set of one or more bits of the second address.

2. The method of claim 1, wherein at least one bit of the first set of one or more bits is different from at least one bit of the second set of one or more bits.

3. The method of claim 2, wherein the first set of one or more bits and the second set of one or more bits comprise mutually exclusive sets of bits.

4. The method of claim 1, wherein determining the second key value comprises accessing a second key table associated with the second requesting component, the second key table comprising a plurality of key value entries indexed based on the second set of one or more bits.

5. The method of claim 1, further comprising transmitting the first access request from the first requesting component to the resource component.

6. The method of claim 1, further comprising:
   determining, at the first requesting component, the first address; and
   transmitting the first address from the first requesting component to the resource component;
   wherein determining the first address and determining the first key value occur during a first operation cycle of the integrated circuit device; and
   wherein transmitting the first address and determining the authorization of the first access request occur during a second operation cycle of the integrated circuit device, wherein the second operation cycle is subsequent to the first operation cycle.

7. A method comprising:
   during a first operational cycle of an integrated circuit device:
      determining, at a first requesting component of the integrated circuit device, an address associated with an access request of the first requesting component; and
      accessing an entry of a key table to determine a first key value, wherein the entry of the key table is indexed based on a first set of one or more bits of the address;
   during a second operational cycle of the integrated circuit device subsequent to the first operational cycle:
      transmitting the address and the first key value from the first requesting component to a resource component; and
      determining, at the resource component, an authorization of the access request based on the first key value and a second set of one or more bits of the address;
   during a third operational cycle of the integrated circuit device subsequent to the second operational cycle:
      determining, at a second requesting component, a second key value based on a third set of one or more bits of a second address associated with a second access request of the second requesting component; and
   during a fourth operational cycle of the integrated circuit device subsequent to the third operational cycle:
      transmitting the second key value from the second requesting component to the resource component; and
      determining, at the resource component, an authorization of the second access request based on the second key value and a fourth set of one or more bits of the second address.

8. The method of claim 7, further comprising:
   performing the access request at the resource component during a third operation cycle of the integrated circuit device subsequent to the second operation cycle in response to determining the access request is authorized.

9. The method of claim 7, wherein the resource component comprises a plurality of memory regions selectively accessible by the requesting component based on a memory access scheme.

10. The method of claim 7, wherein the key table is configured based on the memory access scheme.

11. An integrated circuit device comprising:
   a first requesting hardware component of the integrated circuit device comprising logic to determine a first key value based on a first set of one or more bits of a first address associated with a first access request of the first requesting hardware component and logic to provide the first key value for transmission via a bus;
   a resource component comprising logic to determine an authorization of the first access request based on the first key value and a second set of one or more bits of the first address;
   a first key table associated with the first requesting hardware component and comprising a plurality of key value entries, wherein the logic of the first requesting hardware component determines the first key value by accessing the first key table based on the first set of one or more bits;
   a second requesting component comprising logic to determine a second key value based on a third set of one or more bits of a second address associated with a second access request of the second requesting component and logic to provide the second key value for transmission via the bus; and
   wherein the resource component comprises logic to determine an authorization of the second access request based on the second key value and a fourth set of one or more bits of the second address.

12. The integrated circuit device of claim 11, wherein at least one bit of the first set of one or more bits is different from at least one bit of the second set of one or more bits.

13. The integrated circuit device of claim 12, wherein first set of one or more bits and the second set of one or more bits comprise mutually exclusive sets of bits.

14. The integrated circuit of claim 11, further comprising:
   a second key table associated with the second requesting component and comprising a plurality of key value entries, wherein the logic of the second requesting component determines the second key value by accessing the second key table based on the third set of one or more bits.

15. The integrated circuit of claim 11, wherein first requesting component further comprises logic to provide the first access request for transmission to the resource component via the bus.

16. The integrated circuit of claim 11, wherein:
   the first requesting component further comprises logic to determine the first address and provide the first address for transmission via the bus;
   wherein the logic of the first requesting component determines the first address and determines the first key value during a first operation cycle of the integrated circuit device; and
   wherein the logic of the first requesting component provides the first address for transmission and the first key value and the logic of the resource component determines the authorization of the first access request during a second operation cycle of the integrated circuit device, wherein the second operation cycle is subsequent to the first operation cycle.

* * * * *